(12) United States Patent
Grigorov (10) Patent No.: US 6,647,661 B2
(45) Date of Patent: Nov. 18, 2003

(54) METHOD AND SYSTEM FOR EXTERMINATING PESTS, WEEDS AND PATHOGENS

(76) Inventor: Grigor Rangelov Grigorov, G.K. "Liulin" Bl. 618, Vh. G, Ap. 64, 1336 Sofia (BG)

( * ) Notice: Subject to any disclaimer, the term of this patent is extended or adjusted under 35 U.S.C. 154(b) by 0 days.

(21) Appl. No.: 10/009,065

(22) PCT Filed: Apr. 3, 2001

(86) PCT No.: PCT/BG01/00008

§ 371 (c)(1),
(2), (4) Date: Apr. 1, 2002

(87) PCT Pub. No.: WO01/76362

PCT Pub. Date: Oct. 18, 2001

(65) Prior Publication Data

US 2003/0037482 A1 Feb. 27, 2003

(30) Foreign Application Priority Data

Apr. 4, 2000  (BG) .............................................. 104299

(51) Int. Cl.[7] .................................................. A01M 1/20
(52) U.S. Cl. ......................................... 43/124; 43/132.1
(58) Field of Search ................................ 43/124, 132.1; 219/695

(56) References Cited

U.S. PATENT DOCUMENTS

| | | | | |
|---|---|---|---|---|
| 3,699,976 A | * | 10/1972 | Abe et al. ..................... | 131/299 |
| 4,092,800 A |   | 6/1978  | Wayland et al. |   |
| 4,370,534 A | * | 1/1983  | Brandon ....................... | 219/695 |
| 4,961,283 A | * | 10/1990 | Forbes ......................... | 43/124 |
| 5,058,313 A | * | 10/1991 | Tallon .......................... | 13/124 |
| 5,339,564 A |   | 8/1994  | Wilson et al. |   |
| 5,442,876 A | * | 8/1995  | Pedersen ...................... | 43/124 |
| 5,575,106 A | * | 11/1996 | Martin et al. ................ | 43/132.1 |
| 5,896,696 A | * | 4/1999  | Stokes et al. ................. | 43/124 |
| 5,968,401 A | * | 10/1999 | Roy ............................ | 219/690 |
| 6,150,944 A | * | 11/2000 | Martin et al. ................ | 340/632 |
| 6,192,622 B1 | * | 2/2001  | Haj-Yousef ................. | 43/132.1 |
| 6,281,799 B1 | * | 8/2001  | Lake et al. .................. | 340/573.1 |
| 6,327,812 B1 | * | 12/2001 | Hedman et al. .............. | 43/124 |
| 2002/0180607 A1 | * | 12/2002 | Donskoy et al. ......... | 340/573.2 |
| 2002/0194773 A1 | * | 12/2002 | Topp ........................... | 43/124 |

FOREIGN PATENT DOCUMENTS

| | | | | |
|---|---|---|---|---|
| DE | 3915750 |   | 11/1990 |   |
| DE | 3939269 A1 | * | 5/1991 | ............ A01M/1/22 |
| DE | 29706207 |   | 6/1997 |   |
| FR | 2004819 |   | 5/1969 |   |
| FR | 2684270 A1 | * | 6/1993 | ............ A01M/1/22 |
| GB | 2166633 |   | 5/1986 |   |
| GB | 2292084 |   | 2/1996 |   |
| JP | 04356149 A | * | 12/1992 | .......... A01M/21/04 |
| JP | 06165630 A | * | 6/1994 | ............ A01M/1/00 |
| JP | 2001120145 A | * | 5/2001 | ............ A01M/1/00 |
| JP | 2002011079 A | * | 1/2002 | ............ A61L/2/12 |
| WO | 9613157 |   | 5/1996 |   |

* cited by examiner

*Primary Examiner*—Michael J. Carone
*Assistant Examiner*—Joan M. Olszewski
(74) *Attorney, Agent, or Firm*—Dickstein, Shapiro, Morin & Oshinsky LLP (57) ABSTRACT

The method and the system are applicable in household activities, healthcare, industry, agriculture, forestry, etc. for exterminating pests, weeds and pathogens. The system performing the method comprises a source of lethal impact which is a microwave generator (1) with a microwave guiding element (2) directed so as to face an antenna (3). The microwave generator (1) is placed by means of three supports (4) in the focus area of the antenna (3). The control input of the microwave generator (1) is connected to the output of a control unit (5) whose power supply input is connected to a power unit (6).

13 Claims, 6 Drawing Sheets

METHOD AND SYSTEM FOR EXTERMINATING PESTS, WEEDS AND PATHOGENS

FIELD OF THE INVENTION

The present invention relates to a method and a system for exterminating pests, weeds and pathogens, applicable in household activities, healthcare, industry, agriculture, forestry, etc. and particularly for exterminating pests, weeds and pathogens found in:

wood, such as bark beetles, wood-fretters; pathogens, such as fungi, lichens, bacteria, plasmodia, etc.;

raw hide and leather, fur, fur articles and leather articles, textile and knitted fabrics of natural materials such as skin beetles, moths; pathogens, such as fungi, lichens, bacteria, etc.;

grain, bean and other types of grain foods, loose or packaged, including flour, such as weevils, frit flies, mites, etc.; pathogens such as fungi, bacteria, etc.;

the fields and other natural massifs, homes and industrial sites, various objects including monuments and museum pieces, such as weeds, saplings of unwanted or insignificant wood species, etc.; true mice species such as the lemmings, the house mouse and rat, underground pests, such as rabbits, moles, lesser molerats, European sousliks, etc. and insects such as the mole-cricket, etc.; pathogens, such as fungi, lichens, bacteria, plasmodia, etc.;

the surface layers of plains of water such as swamps, breeding-pools, lakes, reservoirs, marshes, etc. such as spotted-wing mosquitoes and pathogens, such as bacteria, plasmodia, amoebas, paramecia etc.

PRIOR ART

Various methods for exterminating pests, weeds and pathogens are widely known. Each of these methods is particularly specialized according to the objects that are exterminated. For example rodents are exterminated with pesticides with electricity, by traps, etc. Most often different kinds of poisons are used for the extermination of pathogens or they are exterminated by heating the surrounding environment to a high temperature. As regards weeds, mechanical extermination methods, killing by electricity or treatment with poisons—herbicides are used.

A great number of specialized devices according to the methods are also known such as machines for chemical treatment, traps, electricity based devices, spraying machines, etc.

A disadvantage of the methods and devices known in the prior art is that they are closely specialized and in most cases have a harmful impact on the environment due to pollution with chemical substances.

No method and system for simultaneous extermination of pests, weeds and pathogens are known.

The object of the invention is to provide a universal and ecological method and system for exterminating pests, weeds and pathogens simultaneously.

TECHNICAL DESCRIPTION OF THE INVENTION

The aim of the present invention is achieved by providing a method for exterminating pests, weeks and pathogens wherein they are exterminated through a lethal impact. They are killed in their habitats and/or in their preliminarily localized places of residence and locations. The lethal impact is effected by means of a direct guided radiation with high-frequency waves having a frequency ranging from 0.9 to 10 GHz, a radiation capacity 0.5 to 100 KWt and duration of 10 s to 3 min.

It is possible to perform the extermination by direct on the spot treatment of the terrain or of the objects where the habitats and/or locations are found.

It is also possible to perform the extermination through direct treatment of the objects where their habitats and/or locations are found. These objects are then passed on to a stationary exterminating system.

It is possible to preliminary locate the habitats by sensor microwave scanning the habitats and at the same time, through the scanning, the presence of pests in the localized habitats is ascertained. The pests are exterminated immediately after the localization.

During the extermination of the large-sized treated objects it is possible to cause them to rotate around their longitudinal axis.

A system for extermination of pests, weeds and pathogens is also provided comprising a source of lethal impact consisting of a microwave generator with a microwave guiding element facing an antenna. The microwave generator is located in the focus area of the antenna by means of three supports. The control input of the microwave generator is connected to the output of a control unit, whilst its power supply input is connected to a power unit. The antenna is attached to an antenna fork, the opposite end of which is connected to a first axis. The opposite end of the first axis is connected to a first engine by means of a first gear. The vertical part of the L-shaped fork is attached to a second axis through which the first axis passes freely. The second axis is connected to a second engine by means of a second gear. A screening-reflecting plane with microwave sensors under it is attached to the horizontal part of the L-shaped fork. The control inputs of the engines are connected to the respective inputs of the control unit, the power supply inputs of the engines are connected to the respective outputs of the power unit and the outputs of the microwave sensors are connected to the respective inputs of the control unit. The vertical part of the L-shaped fork is movable by means of an extensible cylinder, its control input being connected to a respective output of the control unit. The engines are enclosed into a common carrier casing with apertures for attaching a manipulator.

It is possible that the antenna is parabolic.

It is also possible a mobile platform with a manipulator on it to be connected to the carrier casing at the free edge of the manipulator. The control and power units are situated in the cabin or in the body of the manipulator and are connected to the rest of the components by a multicore cable.

It is possible to place a roller conveyor between the antenna and the screening-reflecting plane whose rollers have a one-way projecting screw thread while opposite to the carrier casing perpendicularly to the working plane a limiter with a fixture is put on the conveyor.

It is possible to place a belt conveyor between the antenna and the screening-reflecting plane.

It is also possible to place an additional screening-reflecting plane facing the antenna behind the treated construction.

It is possible that the two engines and the extensible cylinder are hydraulic.

An advantage of the method and system for exterminating pests, weeds and pathogens is that they are universal, ecological, of high efficiency and productivity.

DESCRIPTION OF THE FIGURES

Further characteristics and advantages of the present invention will become apparent from the following detailed description of an embodiment of the system performing the method for exterminating pests, weeds and pathogens shown on the accompanying figures, wherein.

EXAMPLE OF CARRYING OUT THE INVENTION

Figure 1:
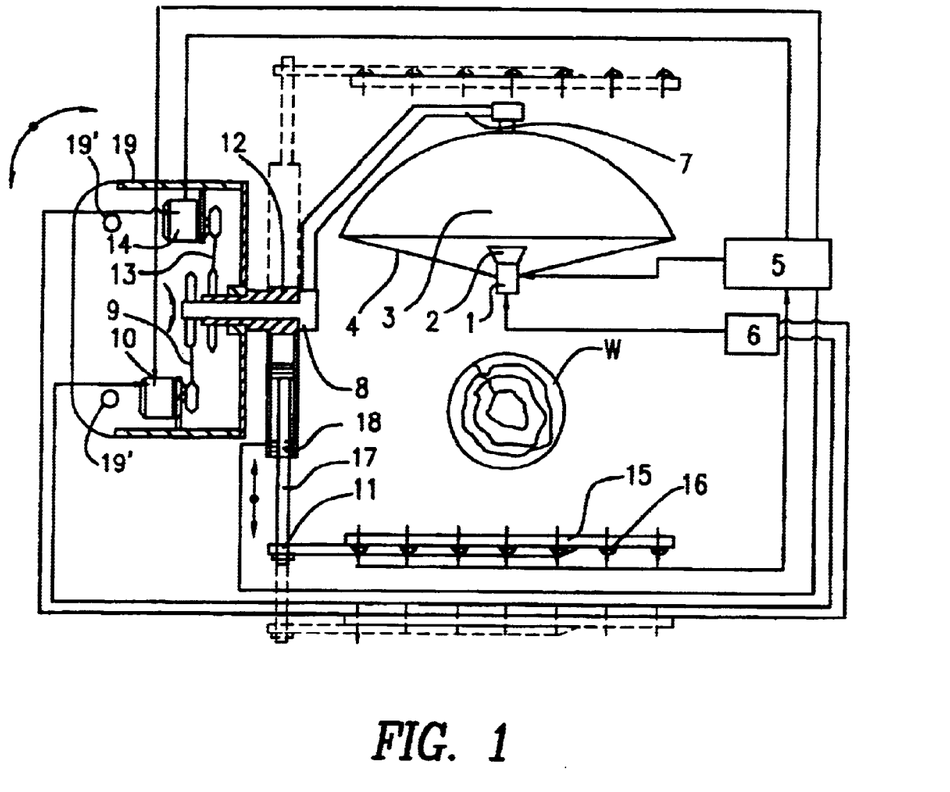
FIG. 1 shows the structure of the system.

The system for exterminating pests, weeds and pathogens shown on FIG. 1 comprises a source of lethal impact which is a microwave generator 1 with a microwave guiding element 2 directed so as to face an antenna 3. The microwave generator 1 is placed by means of three supports 4 in the focus area of the antenna 3. The control input of the microwave generator 1 is connected to the output of a control unit 5 whose power supply input is connected to a power unit 6. The antenna 3 is attached to an antenna fork 7 the opposite end of which is connected to a first axis 8 with its opposite end connected to a first engine 10 by a first gear 9. The vertical part of the L-shaped fork 11 is attached to a second axis 12 through which the first axis 8 passes freely. The second axis 12 is connected to a second engine 14 by means of a second gear 13. To the horizontal part of the L-shaped fork 11 a screening-reflecting plane 15 is attached under which microwave sensors 16 are attached. The control inputs of the engines 10, 14 are connected to the respective inputs of the control unit 5; the power supply inputs of the engines are connected to the respective outputs of the power unit 6. The outputs of the microwave sensors 16 are connected to the respective inputs of the control unit 5. The vertical part 17 of the L-shaped fork 11 is movable by means of an extensible cylinder 18, its control input being connected to a respective output of the control unit 5. The engines 10, 14 are enclosed into a common carrier casing 19 with apertures 19' for attaching a manipulator. It is possible that the antenna 3 is parabolic. It is possible that both engines 10, 14 and the extensible cylinder 18 are hydraulic. The treated object, for example a wood trunk, is designated by the reference numeral W.

It is possible (FIG. 2) a mobile platform 20 with a manipulator 21 on it to be connected to the carrier casing 19 at the free edge of the manipulator 21. The control unit 5 and the power unit 6 are then situated in the cabin 22 or in the body 23 of the manipulator 21 and are connected to the rest of the components by a multicore cable 24.

Figure 3:
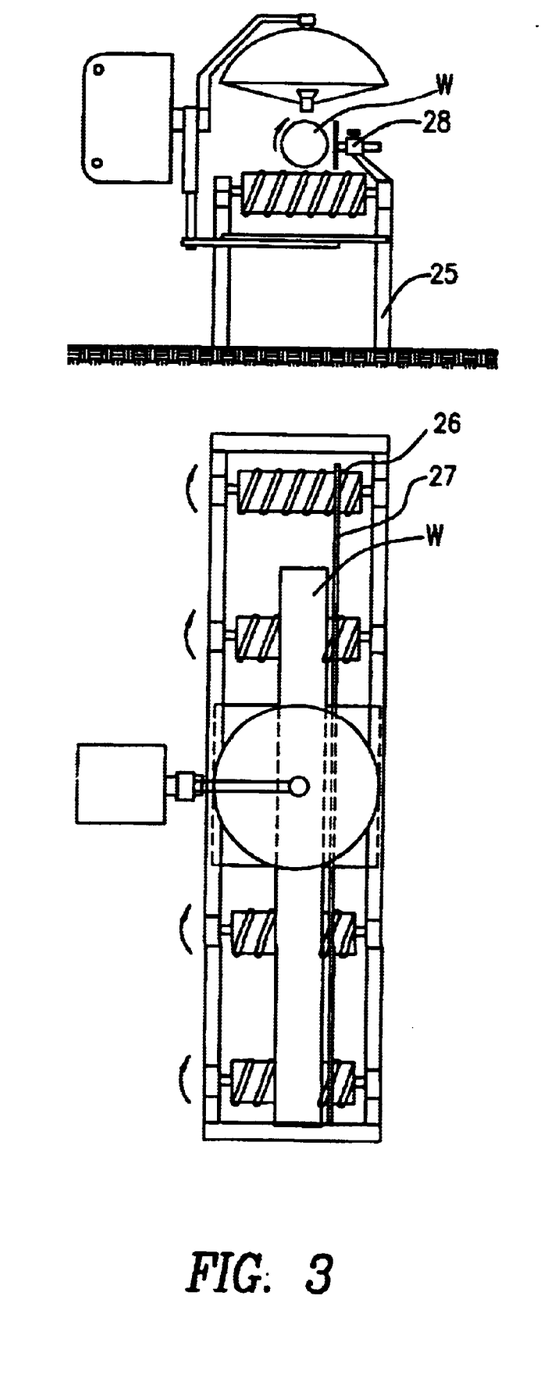
FIG. 3 shows the structure of the system with a screw conveyor.

It is possible (FIG. 3) to place a roller conveyor 25 between the antenna 3 and the screening-reflecting plane 15 whose rollers have a one-way projecting screw thread 26 while opposite to the carrier casing 19 perpendicularly to the working plane a limiter 27 with a fixture 28 is placed on the conveyor 25. The treated object, for example the wood trunk W is put on the threads 26 of the rollers.

Figure 4:
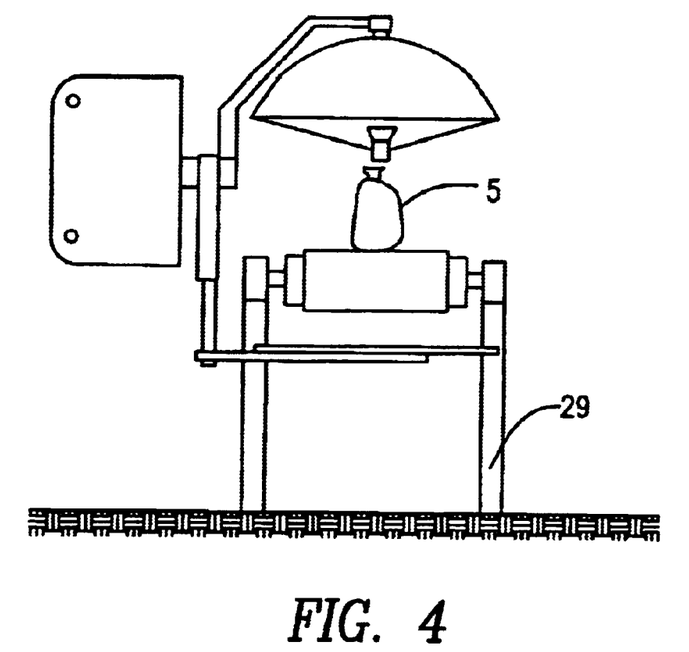
FIG. 4 shows the structure of the system with a belt conveyor.

It is possible (FIG. 4) to place a belt conveyor 29 between the antenna 3 and the screening-reflecting plane 15. The treated object, for example a sack designated with S is put on the belt.

It is possible (FIG. 5) to place an additional screening-reflecting plane 31 facing the antenna 3 behind the treated construction 30.

Figure 6:
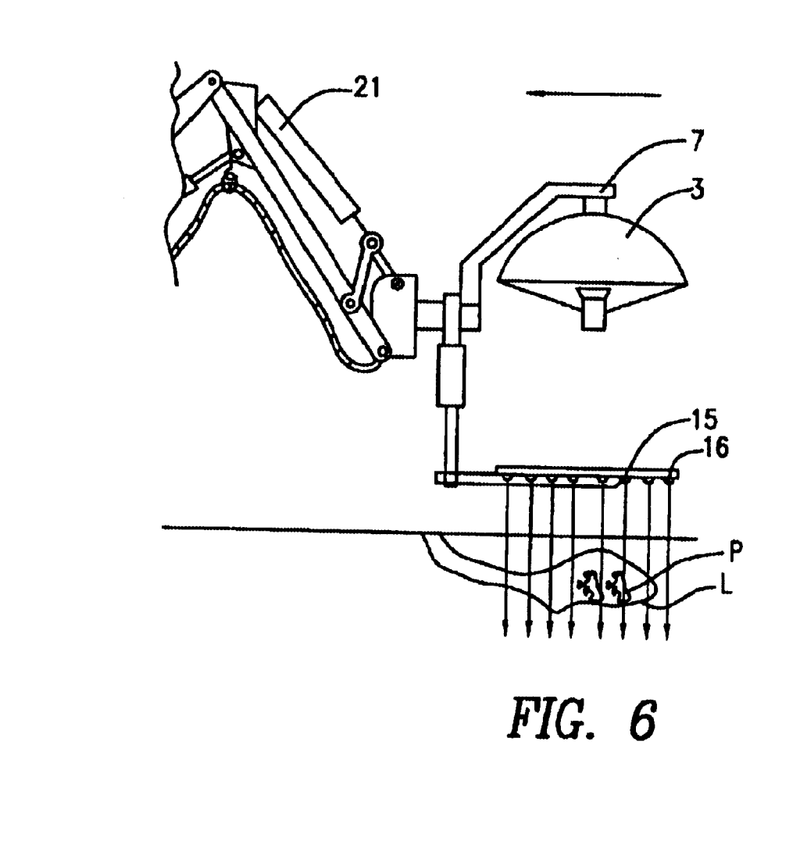
FIG. 6 shows the structure of the system for searching and registering underground pests.

On FIG. 6 the system is shown during localization of the habitats and locations L of the pests P.

Figure 7:
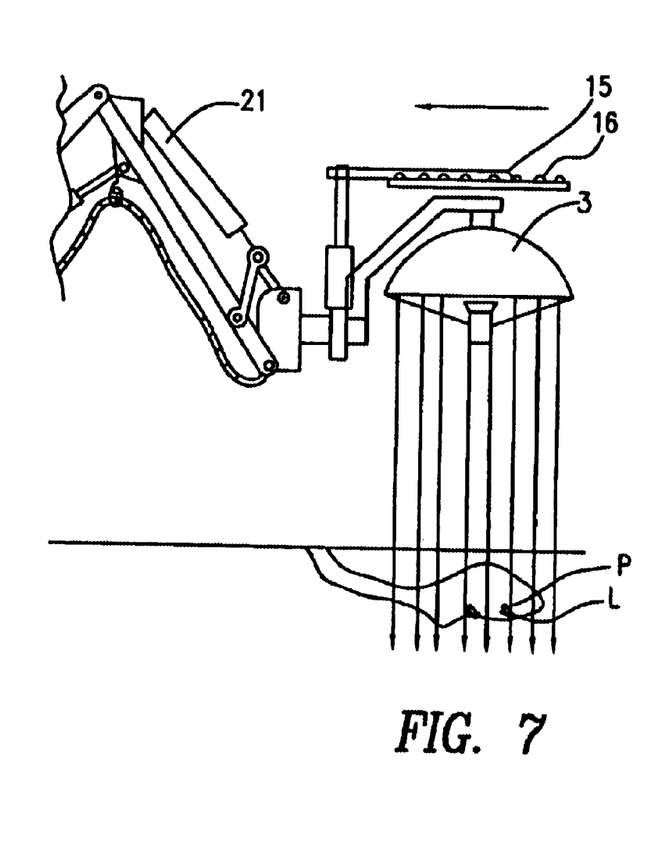
FIG. 7 shows the structure of the system for exterminating underground pests.

On FIG. 7 the system is shown during the extermination of the pests P in their locations L.

Figure 8:
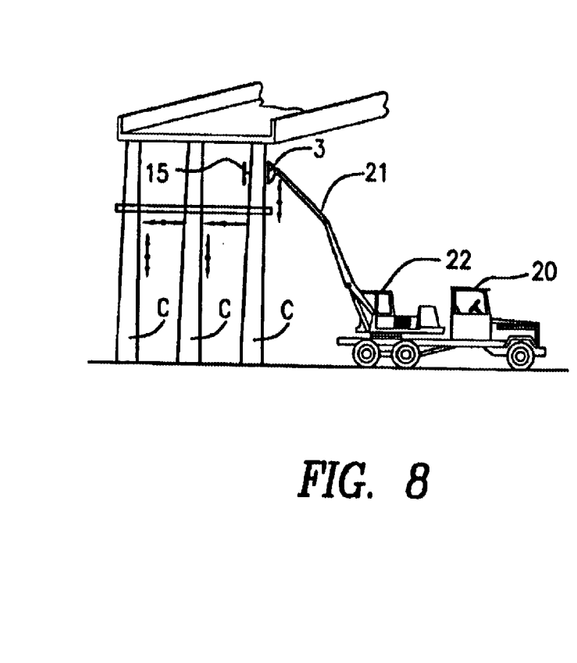
FIG. 8 shows the construction of the system for exterminating pests in building constructions.

On FIG. 8 the system is shown during the treatment of building constructions C.

Figure 9:
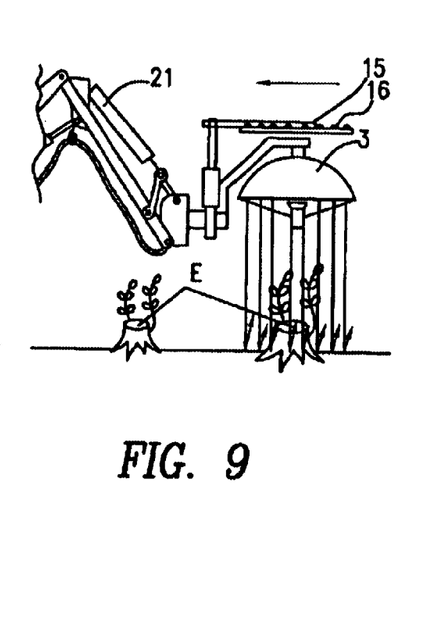
FIG. 9 shows the construction of the system for exterminating weeds and unwanted or insignificant vegetation.

On FIG. 9 the system is shown during the treatment for exterminating weeds, and unwanted or insignificant vegetation E.

Figure 10:
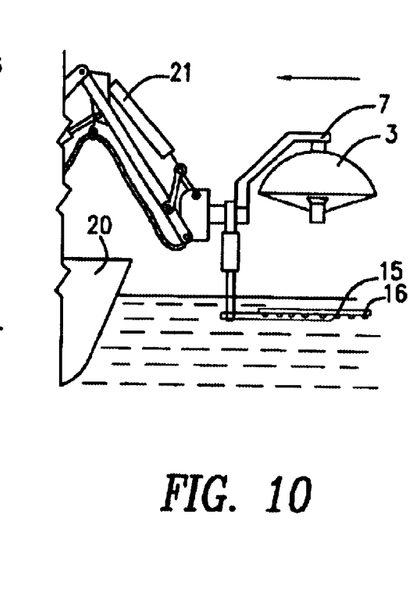
FIG. 10 shows the construction of the system for exterminating pests and pathogens found in the surface and undersurface water layers.

On FIG. 10 the system is shown during the treatment of the surface and undersurface water layers.

Application of the Invention

The system performing the method for exterminating pests, weeds and pathogens operates as follows:

According to the method for exterminating pests, weeds and pathogens they are exterminated through a lethal impact effected by means of a direct guided radiation with high-frequency waves having a frequency ranging from 0,9 to 10 GHz, a radiation capacity 0,5 to 100 KWt and duration 10 s to 3 min. This causes a rapid temperature rise in the tissues of the radiated objects. When the temperature in the tissues reaches 45–55° C. and remains unchanged for 5–10 s, or reaches 55–65° C. and remains unchanged for 3–7 s, or reaches 65–75° C. and remains such for 1–4 s, coagulation of proteins occurs resulting in termination of all life supporting processes in the cells and the organism dies.

The most efficient transformers of microwave energy into thermal energy are the molecules of water and fats constituting an average of about 85% of the cell contents of each living cell. As a result the cells of living organisms are powerful transformers of the energy of the high-frequency waves into thermal energy. In cases when the living organisms inhabit an environment with a comparatively low moisture content, for example dry wood, soil, air, grain foods, flour, clothes, fur, leather, etc., almost all the energy of the high-frequency waves is transformed into thermal energy and this happens precisely in the tissues of the pests, weeds and pathogens. The most appropriate wave frequency rates for their certain extermination by direct guided radiation with high-frequency waves or indirectly by turning microwave antennas is within the range of 3 to 10 GHz. The appropriate radiation capacity of the microwave generators that are used is from 20 to 90 KWt and plus; the radiation duration is from 10 s to 3 min in order to raise the temperature in the tissues of the organisms over 55° C. for at least 5 s. In the presence of constant parameters of the wave frequencies, the radiation capacity and the characteristics of the antenna 3, the temperature rate depends on: the environment where the habitats and locations are situated (wood, soil, textiles made of natural fibres); the depth of the habitats or locations at the time of the treatment of an object; the relative air humidity; the moisture content of the treated object itself, etc. In order to enhance efficiency a screening-reflecting plane 15 may be placed behind the treated object W, S, C, P or L, thus protecting the environment, animals and people from undesirable radiation. By using the platform 20 (the platform may be on the ground, in the air, in the water, underwater) all the components of the system are placed at the sites of the habitats and locations of the organisms that will be exterminated. The mobile platform 20 enables the system when necessary to be transformed into a stationary one on the most appropriate location for the given purpose and where the objects will be passed to undergo treatment. Also, in order to increase the efficiency of the treatment of some objects, for example wood trunks W with a large diameter and/or a comparatively high percentage of moisture content, it is possible that they are caused to rotate around their longitudinal axis by the roller conveyor 25. Thus they are radiated evenly on all sides. Also, in order to increase the efficiency of the system as well as the protection of the living flora and fauna of the soil from harmful impact microwave sensors 16 are attached to the outer part of the screening-reflecting plane 15. The microwave sensors 16 search for and locate the objects to be exterminated on the terrain they occupy, for example in soil cavities such as passageways and the habitations of underground pests such as lemmings, European sousliks, moles, rabbits, etc. as well as their exact locations in their homes. After their localization the mobile platform 20 is stationed on the spot and only the exact location and the pests in it are radiated with a lethal dose. The maximum location depth of most of the mentioned pests is 40 cm and the treatment of such objects is most efficient when the soil is dry. The calamities (the mass appearance of pests in large numbers) of most pests are observed mainly during the dry periods of the year since at periods of heavy rainfalls most pest are drowned.

Figure 2:
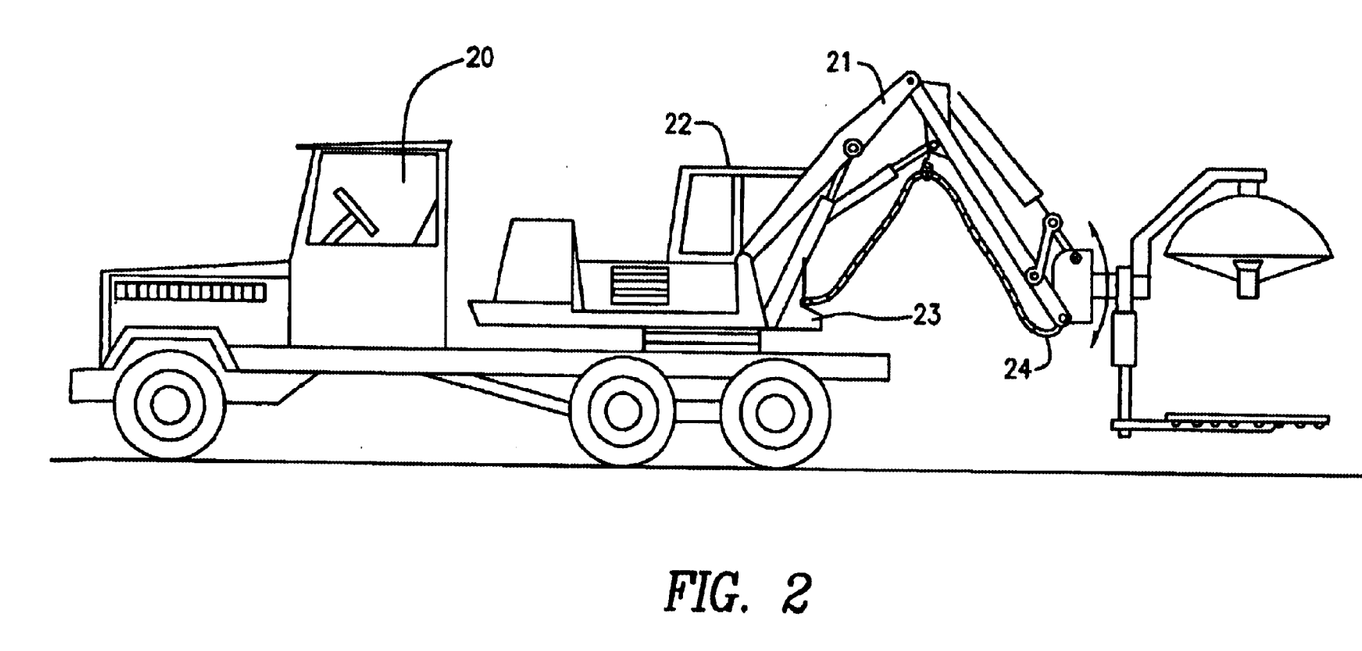
FIG. 2 shows the structure of the system with a mobile platform.

The microwave system is stationed at the most appropriate position for radiating the treated object W (FIG. 1) by means of simultaneous or successive movements of the manipulator 21 and/or of the mobile platform 20 (FIG. 2). The apertures 19' on the body 19 ensure the firm attachment of the manipulator 21 to the system by means of the manipulator connecting elements (not shown on the figure). By means of the engine 10 (FIG. 1) through the gear 9 and the axis 8 on the opposite end of which on the antenna fork 7 the antenna 3 is attached, the last one is positioned through a 360° rotation so as to face the object W. By means of the engine 14 (FIG. 1) through the gear 13 and the axis 12 the L-shaped fork 11 is positioned so as to face the antenna 3 and thus the screening-reflecting plane 15 acts as a protective screen against parasitic radiation of the antenna 3 in the opposite direction of treatment during the extermination of objects. The horizontal part of the L-shaped fork 11 with the screening-reflecting plane 15 can be positioned at an optimum distance from the treated object W (FIG. 1) by means of the extensible cylinder 18 in the vertical part 17 of the L-shaped fork 11. The high degree of freedom of the system allows placing the antenna 3 precisely above the treated object W or putting the sensors 16 in a localization mode (FIGS. 6, 7).

By means of the mobile platform 20 (FIG. 2) through the microwave generator 1 with the microwave guiding element 2 being positioned in the focus area of the antenna 3 by means of the three supports 4 (FIG. 1), the microwave system performs a direct on the spot treatment of the terrain or the objects, i.e. where the habitats and locations of the pests and pathogens are found. The control unit 5 assigns and controls all system manipulations and operation modes and is designed as a standard microprocessor configuration supplied with standard software. The unit 5 assigns the operation modes at the command of an operator (not shown on the figures) or automatically depending on the located pest, the type and state of the object and the environment conditions mentioned above. By means of the flexible multicore cable 24 the power unit 6 and the control unit 5 provide the power supply of the system and deliver the commands to the other components of the system connected to them. The units are situated in the cabin 22 or directly in the body of the manipulator 23 which protects them from harmful outside effects.

It is possible (FIG. 3) to station the mobile platform 20 at an appropriate place and to perform the extermination of the pests and pathogens on/inside the objects W. The objects W are set into a mode of gradual increasing rotation by means of the screw thread 26 of the rollers of the roller conveyor 25, the last being positioned between the antenna 3 and the screening-reflecting plane 15. The convenience of the system is that it can be situated for use in the open field, for example near a wood-cutting area in the temporary timber-yard where the cut wood is stored. The limiter 27 is movable and depending on the diameter of the treated object W the distance between the axial line of the conveyor 25 and the limiter 27 is set so that it is equal to the radius of the object W which is thus treated at an optimum degree. The fixture 28 is used for locking the limiter 27 so as to avoid any undesirable displacements of the limiter 27 caused by the weight of the treated objects, for example by the wood trunks W.

When (FIG. 4) the mobile platform 20 is stationed at an appropriate place between the antenna 3 and the screening-reflecting plane 15 a belt conveyor 29 is positioned and the treated objects S, for example sacks containing grain foods, flour, clothes, books, leather, hide, etc., are passed on for direct radiation by being placed onto the belt of the conveyor 29. In this way flows of small-sized objects can be treated without being preliminary packaged.

When (FIG. 5) floors, walls and ceilings of interior rooms, sewer systems of residential areas, etc. are treated an additional screening-reflecting plane 31, for example wide-area aluminium foil, is positioned behind the treated construction 30 (on the floor, walls and ceilings of the adjacent room, on the roadway). This improves the radiation effect and at the same time prevents the surrounding environment in the neighboring rooms facing the antenna 3 from undesirable radiation.

When (FIG. 6) the passageways, locations L and the presence of underground pests P are searched for and localized the platform 20 and the manipulator 21 move along in straight rows in the field while the L-shaped fork 11 is rotated in such a way so that the microwave sensors 16 are situated above the investigated surface. When they give a signal that a habitat with a pest in it has been localized the platform 20 stops and the control unit 5 gives a signal to the engine 14. The engine 14 rotates the L-shaped fork 11 through 180° with the attached to it horizontal part of the screening-reflecting plane 15 which is positioned behind the antenna 3. As a result the underground pests P are directly radiated (FIG. 7). After that the system returns to a localization mode (FIG. 6) and resumes its movement along the respective row of the treated surface.

Figure 5:
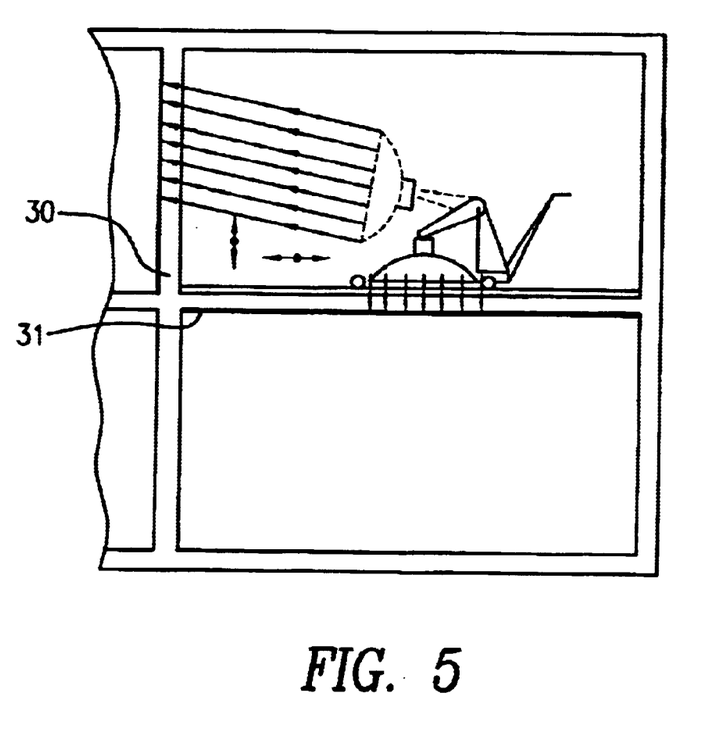
FIG. 5 shows the structure of the system for treatment of walls, ceilings and floors.

When (FIG. 8) the mobile platform 20 is positioned at constructions C with a complex structure, for example bridges, road overpasses, etc. the antenna 3 and the screening-reflecting plane 15 (or an additional screening-reflecting plane 31—not shown on the figure) are positioned in a likewise manner already mentioned in the above cases shown on FIGS. 1, 2, 5.

When (FIG. 9) weeds or unwanted or insignificant wood species E are exterminated the antenna 3 and the screening-reflecting plane 15 are positioned in a likewise manner shown on FIG. 7.

When (FIG. 10) the microwave system treats water or underwater surface layers the mobile platform 20 may be a boat, motor-launch or other similar vessel. In this case the surface water layers, for example, layers of medium-sized and stagnant basins, are treated directly and the pests, for example the larvae of the spotted-wing mosquitoes, etc. are exterminated.

The provision of additional safety measures and the increasing of the efficiency of the microwave extermination effect can be achieved by similar additional positioning of mobile screening-reflecting planes (not shown on the figures) in the surrounding space in which the microwaves spread in all variants of the application of the system.

What is claimed is:

1. A method for exterminating pests, weeds and pathogens, wherein they are exterminated by a lethal impact characterized in that they are killed in their habitats or locations, a preliminary localization of the habitats or locations is performed by sensor microwave scanning, the presence of the pests, weeds and pathogens is ascertained by the scanning, and then the lethal impact is effected by means of direct guided radiation with high-frequency waves having a frequency ranging from 0.9 to 10 GHz, a radiation capacity 0.5 to 100 KWt and duration 10 s to 3 min.

2. The method according to claim 1 characterized in that the extermination is performed by direct on the spot treatment of an area where their habitats or locations are found.

3. The method according to claim 1 characterized in that extermination is performed through direct treatment of the habitats or locations after being passed on to a stationary exterminating system.

4. The method according to claim 1 characterized in that the preliminary localization of the habitats or location is performed by sensor microwave scanning of the habitats or locations and at the same time, through the scanning, the presence of pests in the localized habitats or locations is ascertained and the pests are exterminated immediately after the localization.

5. The method according to claim 1 characterized in that the habitate is large-sized and is caused to rotate around its longitudinal axis.

6. A system for exterminating pests, weeds and pathogens comprising a source of lethal impact characterized in that the source of lethal impact is a microwave generator (1) with a microwave guiding element (2) facing an antenna (3), wherein the microwave generator (1) is placed by means of three supports (4) in the focus area of the antenna (3), while its control input is connected to the output of a control unit (5) whose power supply input is connected to a power unit (6), and the antenna (3) is attached to an antenna fork (7) the opposite end of which is connected to a first axis (8) with its opposite end connected to a first engine (10) by a first gear (9), the vertical part of the fork (11) is attached to a second axis (12) through which the first axis (8) passes freely and the second axis (12) is connected to a second engine (14) by means of a second gear (13), and to the horizontal part of the fork (11), a screening-reflecting plane (15) is attached under which microwave sensors (16) are attached, the control inputs of the engines (10, 14) are connected to the respective inputs of the control unit (5), the power supply inputs of the engines are connected to the respective outputs of the power unit (6), and the outputs of the microwave sensors (16) are connected to the respective inputs of the control unit (5), and the vertical part (17) of the fork (11) is movable by means of an extensible cylinder (18), its control input being connected to a respective output of the control unit (5), the engines (10, 14) are enclosed into a common carrier casing (19) having apertures (19') for attaching a manipulator.

7. The system for exterminating pests, weeds and pathogens according to claim 6 characterized in that the antenna (3) is parabolic.

8. The system for exterminating pests, weeds and pathogens according to claim 6 characterized in that a mobile platform (20) with a manipulator (21) on it is connected at its free edge to the carrier casing (19), wherein the control unit (5) and the power unit (6) are situated in a cabin (22) or in a body (23) of the manipulator (21) and are connected to the rest of the components by a multicore cable (24).

9. The system for exterminating pests, weeds and pathogens according to claim 6 characterized in that a roller conveyor (25) is placed between the antenna (3) and the screening-reflecting plane (15) whose rollers have a one-way projecting screw thread (26), while opposite to the carrier casing (19) perpendicularly to a working plane a limiter (27) with a fixture (28) is placed on the conveyor (25).

10. The system for exterminating pests, weeds and pathogens according to claim 6 characterized in that between the antenna (3) and the screening-reflecting plane (15) a belt conveyor (29) is placed.

11. The system for exterminating pests, weeds, and pathogens according to claim 6 characterized in that an additional screening-reflecting plane (31) is placed facing the antenna (3).

12. The system for exterminating pests, weeds and pathogens according to claim 6 characterized in that the two engines (10, 14) and the extensible cylinder (18) are hydraulic.

13. The system for exterminating pests, weeds and pathogens according to claim 6 characterized in that the fork is L-shaped.

* * * * *